July 21, 1959 E. WAGNER ET AL 2,895,227
MACHINE FOR THE TESTING OF HOBS
Filed Dec. 9, 1955 2 Sheets-Sheet 1

Inventors
ERICH WAGNER
FRIEDRICH ALBERT WALDER
BY Mead, Browne, Schuyler
& Beveridge
ATTORNEYS

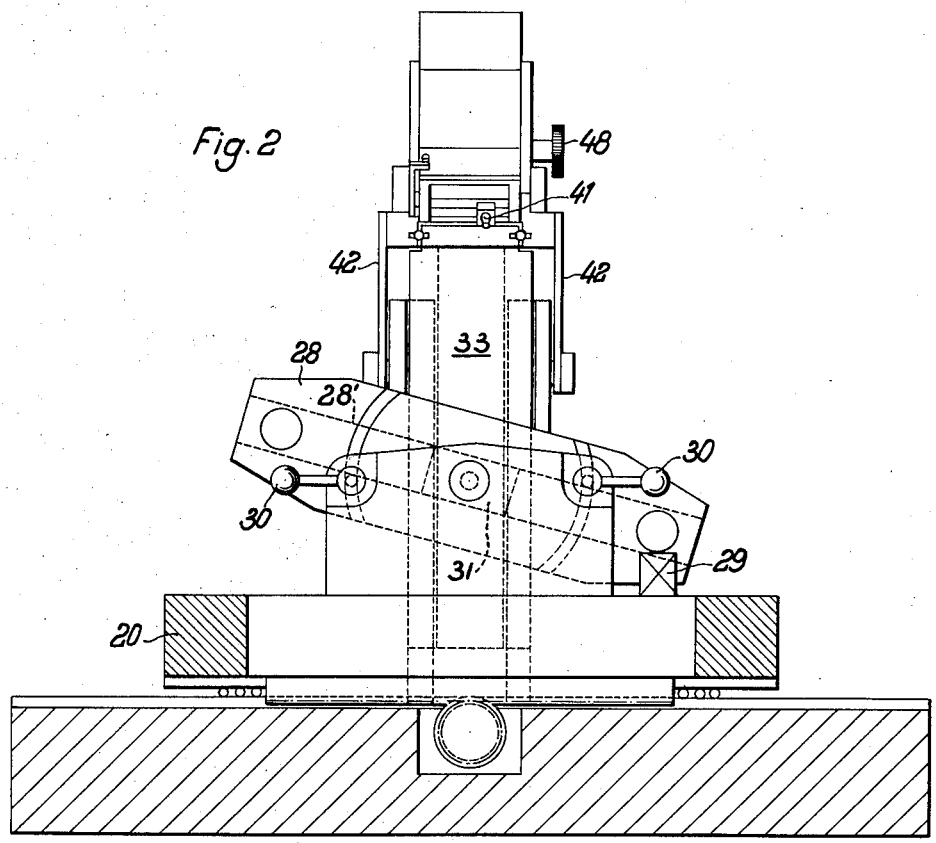
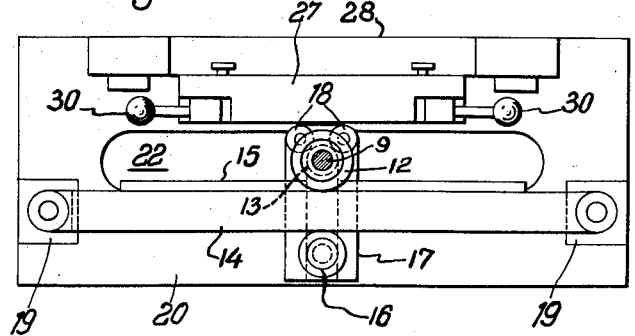
Inventors
ERICH WAGNER
FRIEDRICH ALBERT WALDER
BY Mead, Browne, Schuyler & Beveridge
ATTORNEYS

United States Patent Office 2,895,227
Patented July 21, 1959

2,895,227

MACHINE FOR THE TESTING OF HOBS

Erich Wagner and Friedrich Albert Walder, Huckeswagen (Rhineland), Germany, assignors to W. Ferd Klingelnberg Söhne, Remscheid-Berghausen, Germany, a corporation of Germany Application December 9, 1955, Serial No. 552,189

Claims priority, application Germany December 11, 1954

4 Claims. (Cl. 33—179.5)

This invention relates to a machine for testing hobs used in gear cutting, and more particularly to a machine for testing hobs which may be used for making a plurality of different tests on the hob such as contact line, lead and profile tests.

Machines are known for testing hobs which include a stylus which moves with a screwing motion past the cutting edges of the hob from one tooth to the next. This screwing motion is produced by means of traverse screws or generating band mechanisms. However, the use of traverse screws has the inherent drawback of limited manufacturing accuracy which make them altogether inadequate for testing purposes, while generating bands restrict the screwing traverse to a greater extent than is desirable. The present invention provides a screwing motion through elements derived from the well-known involute testers; i.e., rolling disc and rolling bar.

It is an object of this invention to provide a machine for testing hobs which is capable of performing a plurality of different tests on a hob.

It is another object of this invention to provide a testing apparatus for hobs which is accurate and simple in operation.

It is still a further object of this invention to provide an apparatus for testing hobs in which the motion of the hob relative to the stylus is derived from a rolling disc and a rolling bar.

In achievement of these objectives, there is provided in accordance with this invention a hob testing apparatus comprising a rolling disc mounted on a common axis with the hob being tested and coupled to the hob, and a rolling bar operating in conjunction with the rolling disc as on involute testers and having a length equivalent to several times the circumference of the rolling disc. A first guideway which is inclined to the direction of travel of the rolling bar controls the movement of the measuring stylus in a direction axially of the hob being tested. Movement is imparted to the rolling bar to cause rotation of the rolling disc and hence of the hob, and movement is concurrently imparted to the first guideway to cause axial movement of the stylus in a predetermined relation to the rotary movement of the hob. A second guideway inclined relative to the hob axis causes radial movement of the stylus relative to the hob during the axial travel of the stylus. The stylus is also supported upon a hinged platform which permits angular adjustment of the stylus. The stylus is also movable laterally and longitudinally with respect to the hinged platform.

Further objects and advantages of the invention will become apparent from the following description taken in conjunction with the accompanying drawings in which:

Fig. 2 is a cross sectional view of the apparatus of Fig. 1, taken approximately on the line 2—2 of Fig. 1; and Fig. 3 is a sectional view, taken on line 3—3 of Fig. 1.

Figure 1:
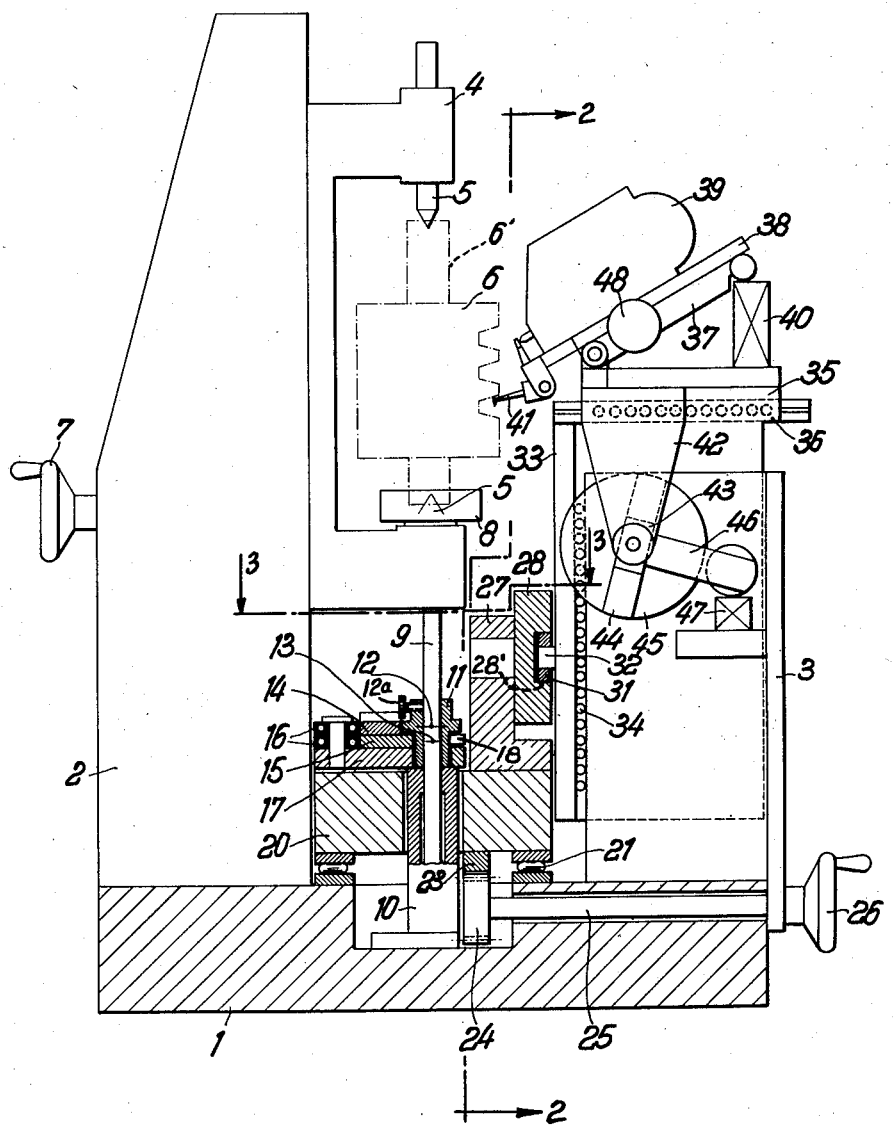
Fig. 1 is a side elevation view of the hob testing apparatus partially in section.

Referring now to the drawings, the testing apparatus of the invention comprises a pedestal 1 which supports a column 2 for the work head and a second column 3 for the measuring head. The work support 4 is vertically adjustable on column 2 by means of a hand wheel 7. The hob 6 which is being tested includes an arbor or shaft 6′ which is mounted between the oppositely extending centres 5. A coupling 8 connects the lower end of hob shaft 6′ rigidly to a shaft 9. The lower end of shaft 9 is suitably supported for rotation in a vertical bearing 10 mounted on pedestal 1.

A stepped boss 11 is mounted on shaft 9 and is firmly clamped to shaft 9 at a selected axial location thereon by suitable means such as a thumb screw 12a whereby shaft 9 is rotated when boss 11 is rotated. Boss 11 is provided with a pair of concentric large and small diameter portions 12 and 13 which, for convenience, are hereinafter referred to as rolling discs. As shown in Figs. 1 and 3, rolling disc 12 is in contact with a side surface of a first rolling bar 14. A second rolling bar 15 is located immediately beneath rolling bar 14 but, as shown in Fig. 1, does not contact rolling disc 13 when rolling disc 12 is in contact with rolling bar 14.

A rolling disc and a rolling bar coact to establish a predetermined rate of rotation of shaft 9, and hence hob 6, as a selected function of the rate of horizontal movement of the rolling bar in a direction from left to right or right to left in Fig. 3. Essentially, the contact between rolling disc 12 and its associated rolling bar 14 is a friction drive coupling. To regulate the contact pressure between rolling disc 12 and rolling bar 14, a yoke element 17 is located below rolling bar 15. A pair of spaced rotatable bearing elements 18 are mounted at one end of yoke 17 in a position such that they contact the curved periphery of rolling disc 13 as shown in Figs. 1 and 3. A pair of ball bearing elements 16 are rotatably supported at the opposite end of yoke 17, there being a bearing element 16 associated with each of the rolling bars 14 and 15.

Suitable means, not shown, are provided for independently adjusting bearings 16 to individually adjust the respective contact pressure between the rolling bars 14 and 15 and rolling discs 12 and 13 so that only one rolling bar will be in engagement with its rolling disc at any given time.

The ends of the rolling bars 14 and 15 are attached by means of clamps 19 (Fig. 3) to a rolling slide member 20 which moves on track 21 carried by pedestal 1. Rolling slide 20 has a recess 22 to permit free movement of slide 20 with respect to the vertical bearing 10. Slide 20 carries on its underneath surface a rack member 23 which meshes with a pinion 24 carried by a shaft 25. Mounted on the outer end of shaft 25 is a hand wheel 26 which permits rotation of shaft 25 and pinion 24 to cause a reciprocating movement of rack 23 and the attached slide 20.

While yoke 17 is not directly attached to slide 20, yoke 17 remains stationary during reciprocating movement of slide 20, and thus, referring to Fig. 3, rolling bar 14 moves in horizontal reciprocating movement between the upper bearing 16 and rolling disc 12 to thereby rotate shaft 9 about its fixed axis at a predetermined rate in direct proportion to rate of horizontal movement imparted to slide 20 and the attached rolling bar 14.

Slide 20 supports, on the same surface as that facing the rolling bars 14 and 15, a bracket member 27 to which is pivotally connected an angularly adjustable guide member 28. The guide member 28 may be adjusted to any angular position in a vertical plane by means of a slip gauge 29 shown in Fig. 2. When guide member 28 has been adjusted to the desired inclination, it may then be locked in place by means of handles 30 carried by bracket 27 which actuate locking elements engageable with guide member 28. Guide member 28 is provided with a longitudinally extending slot 28' which slidably receives a pivoted T-bolt 31 having a pivot 32 carried by a vertical slide member 33. Slide 33 is guided for vertical movement on ball tracks 34 carried by column 3. It can be seen that reciprocating horizontal motion imparted to bracket 27 and its attached inclinable guide member 28 causes a vertical movement of vertical slide member 33 at a rate which is dependent upon the angular adjustment of inclined guide member 28. The vertical slide 33 is counterbalanced.

Vertical slide 33 has at its upper end a horizontal slide 35 which is guided on ball tracks 36 carried by a horizontal track portion on vertical slide 33. Horizontal slide 35 has a hinged table 37 with a slide 38 on which the indicating unit 39 is mounted. The inclination of table 37 is adjusted by use of slip gauges 40. The indicating unit 39 is supported by table 38 and carries a stylus 41 which is engageable with the surface of the hob 6. In the view shown in Fig. 2, the tip of the stylus 41 is offset from the axis of hob 6 and lies in a plane which is tangential to the involute base cylinder of the hob. The position of stylus 41 may be laterally adjusted with respect to the hob axis to permit the offset position shown in Fig. 2. The slide 38 may also be adjusted longitudinally of table 37 that is toward or away from hob 6 along the inclined surface of table 37 as shown in Fig. 1 by means of the knob 48.

Connected to and extending downwardly from both sides of horizontal slide 35 are arms 42 which carry guide members 43 engageable in slots 44 carried by circular discs 45. Discs 45 are pivotally supported by column 3 and carry lever members 46 which permit angular adjustment of discs 45 and consequently of slots 44 through the use of slip gauges 47 supported by column 3.

The operation of the testing apparatus will be described first in connection with the making of a contact line pitch test on the hob. The guide member 28 is inclined with the aid of slip gauges 29 so that when crank handle 26 is turned the axial movement of stylus 41 and the rotary movement of hob 6 corresponds to the theoretical screw pitch of the hob to be tested. The stylus 41 is adjusted radially away from the axial section of the hob by the radius of the base cylinder to a position similar to that shown in Fig. 2 in which the stylus 41 is offset from the axis of hob 6. The slot 44 in each circular disc 45 is set at an angle to the direction of movement of vertical slide 33 so that the resultant traverse of the stylus 41 caused by the vertical travel of slide 33 and the horizontal travel of slide 35 is inclined relative to the hob axis to the extent of the lead angle of the hob spiral on the base cylinder. By turning the hand wheel 26, the stylus 41 performs a screwing motion relative to the hob piece from one tooth to the next resulting from the rotation of the hob around its axis and the vertical movement of the stylus parallel to the axis of hob 6. Since in the same time the stylus moves radially in the described manner, the resulting motion of the stylus is along the contact line and the apices of the test curve. The apices of a test curve registered by the indicating unit show the positions of the cutting edges. Any deviations from the theoretical position can be readily recognized.

In making a lead test, the guide slot 44 of each disc 45 is aligned with the direction of travel of vertical slide 33 so that there is no horizontal movement of slide 35 during the vertical movement of slide 33. The guide member 28 is angularly adjusted to cause a vertical movement of stylus 41 relative to the rate of rotation of hob 6 which corresponds to the theoretically correct lead of the hob. When operating handle 26 is turned to cause reciprocation of slide 20 and guide 28, vertical slide 33 is moved vertically as hob 6 is rotated. Any deviations of the hob lead from its theoretically correct value are indicated by deflections of the stylus 41.

To make the flank or profile test, the slide 38 is moved on table 37 and small angular reciprocating motions are performed with hob 6. During this test, no vertical motion is imparted to the vertical slide 33.

It can be seen from the foregoing that there is provided in accordance with this invention a machine for testing hobs which is simple and accurate in operation and which permits a plurality of different tests on hobs to be performed on the same testing machine, thereby eliminating the necessity for different testing machines for the different tests.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What is claimed as the invention is:

1. An apparatus for testing hobs comprising means for supporting a hob for rotation about a fixed axis, a rolling friction driven means coupled with and mounted for rotation about a common axis with said hob, a rolling friction drive means engaging said rolling friction driven means to produce rotation of said hob, a stationary support column, a support element mounted upon said column for movement relative to said column along a path parallel to the axis of said hob, a stylus carrying element mounted upon said support element for movement relative to said support element in a direction radially of said hob, first guide means coupling said support element to said rolling friction drive means for moving said support element upon said column axially of said hob at a predetermined rate relative to the rotation imparted to said hob by said rolling friction drive means, and second guide means coupling said stylus carrying element to said support column to move said stylus carrying element relative to said support element in a direction radially of said hob at a predetermined rate upon movement of said support element relative to said column along said path.

2. An apparatus for testing hobs as defined in claim 1 wherein said second guide means comprises a disc member mounted in said support column for rotative adjustment about an axis mutually perpendicular to the paths of movement of said support element and said stylus carrying element, said disc having a diametrically extending slot therein, and a guide member carried by said stylus carrying element slidably engaged within said slot.

3. An apparatus for testing hobs comprising means for supporting a hob for rotation, a rolling friction driven means coupled with and mounted on a common axis with the hob being tested, a rolling friction drive means engaging said rolling friction driven means to produce rotation of the hob, a first support means movable axially of the hob, a stylus support means carried by and movable with said first support means, said stylus support means being movable relative to said first support means in a direction radially of the hob, a first guide means inclined relative to and movable transversely of the axis of the hob, said guide means being slidably engaged with said first support means, means for concurrently moving said rolling friction drive means and said first guide means whereby said first support means is moved axially of the hob at a predetermined rate relative to the rotation of the hob, and a second guide means engageable with said stylus support means, said second guide means being effective to produce radial movement of said stylus support means relative to the hob concurrently with axial movement of said first support means relative to the hob, whereby said stylus is moved axially and radially concurrently with rotation of the hob.

4. An apparatus for testing hobs comprising means for supporting a hob for rotation, a rolling disc coupled with and mounted on a common axis with the hob being tested, a rolling bar supported in rolling frictional contact with said rolling disc whereby movement of said rolling bar produces rotation of said disc and of the hob, a first support means movable axially of the hob, a stylus support means carried by and movable with said first support means, said stylus support means being movable relative to said first support means in a direction radially of the hob, a first guide means inclined relative to the movement of said rolling bar and engageable with said first support means, means for concurrently moving said rolling bar and said guide means whereby said first support means is moved axially of the hob at a predetermined rate relative to the rotation of the hob, and a second guide means engageable with said stylus support means, said second guide means being effective to produce radial movement of said stylus support means relative to the hob concurrently with axial movement of said first support means relative to the hob, whereby said stylus is moved axially and radially of the hob concurrently with rotation of the hob.

References Cited in the file of this patent

UNITED STATES PATENTS

| | | |
|---|---|---|
| 1,667,109 | Garlent | Apr. 24, 1928 |
| 1,757,720 | King | May 6, 1930 |
| 1,843,347 | Steelsmith | Feb. 2, 1932 |
| 1,898,084 | Drader | Feb. 21, 1933 |
| 2,046,506 | Drader | July 7, 1936 |
| 2,108,414 | Schurr | Feb. 15, 1938 |

FOREIGN PATENTS

| | | |
|---|---|---|
| 874,526 | France | Aug. 10, 1942 |
| 590,666 | Great Britain | July 24, 1947 |